United States Patent [19]

Takeuchi

[11] 4,282,799
[45] Aug. 11, 1981

[54] NEGATIVE PRESSURE BOOSTER
[75] Inventor: Hiroo Takeuchi, Ueda, Japan
[73] Assignee: Nissin Kogyo Kabushiki Kaisha, Ueda, Japan
[21] Appl. No.: 83,534
[22] Filed: Oct. 10, 1979
[30] Foreign Application Priority Data
Feb. 2, 1979 [JP] Japan ................................ 54-11740
[51] Int. Cl.³ .............................................. F15B 9/10
[52] U.S. Cl. .................................... 91/369 A; 60/554
[58] Field of Search ............ 91/369 A, 369 R, 369 B; 60/554, 552

[56] References Cited
U.S. PATENT DOCUMENTS 3,110,031  11/1963  Price ................................. 91/369 A
3,132,567  5/1964   Ingres et al. ...................... 91/369 A
4,069,742  1/1978   Gephert et al. ................... 91/369 A Primary Examiner—Paul E. Maslousky
Attorney, Agent, or Firm—Haseltine & Lake

[57] ABSTRACT

A negative pressure booster wherein a brake master cylinder of an automobile is boosted and operated under negative pressure. The booster comprises a booster shell, a booster piston to divide the interior of the booster shell into a first and second operating chambers, a valve cylinder, a valve piston received in the valve cylinder and a reaction piston. The sliding stroke of the reaction piston is regulated to be smaller than the sliding stroke of the valve piston so that even if the valve piston is largely retracted, the amount of inflation and deformation of the resilient piston may be minimized.

2 Claims, 2 Drawing Figures

NEGATIVE PRESSURE BOOSTER

BACKGROUND AND SUMMARY OF THE INVENTION

The present invention principally relates to improvements in negative pressure boosters in which a brake master cylinder of an automobiles is boosted and operated under negative pressure, and more particularly to a booster comprising a booster piston which divides the interior of a booster shell into a first operating chamber internally communicated with a negative pressure source and a second operating chamber, and a valve cylinder protruded at the rear of the booster piston and having a first annular valve seat disposed at the front portion thereof, the valve cylinder slidably receiving a valve piston having a second annular valve seat encircled by said first valve seat and connected to an input rod and including a cylindrical resilient valve body having a valve portion biased to be seated on said first and second valve seats and inside of which is open to the atmosphere, whereby when said valve piston is moved forward, said second operating chamber and said inside of said valve body are brought into communication through a clearance formed between said second valve seat and said valve portion whereas when said valve piston is retracted, said first and second operating chambers are brought into communication through a clearance formed between said first valve seat and said valve portion, and said booster piston is connected through a resilient piston to an output piston communicated with an output rod so that operative reaction of said output piston causes the resilient piston to give rise to compressed deformation, a part of the compressive force being fed back to the valve piston and input rod through a reaction piston to impart a sense of operation to an operator.

In the booster of the type as described, the resilient piston functions as if it were a non-compressed fluid to transmit the operative reaction of the output piston to the reaction piston. Thus, the above-mentioned booster has advantages that it is possible to determine simply the boost ratio from the ratio of area between the output piston and the reaction piston, and the device is easy in design and simple in construction. In prior art boosters, however, when the input rod is retracted (at this time, the valve piston is considerably retracted), the resilient piston undergoes inflated deformation toward the reaction piston through a sliding stroke portion of the valve piston. Since such inflated deformation is produced in great amount, the resilient piston is apt to become fatigued and failed in a short period of time in addition to poor durability.

It is therefore an object of the present invention to provide a negative pressure booster which can overcome the difficulties noted above with respect to prior arts.

BRIEF DESCRIPTION OF THE DRAWINGS

Further objects and features of this invention will become apparent from the following description in connection with the accompanying drawings, in which.

DESCRIPTION OF THE PREFERRED EMBODIMENT

Figure 1:
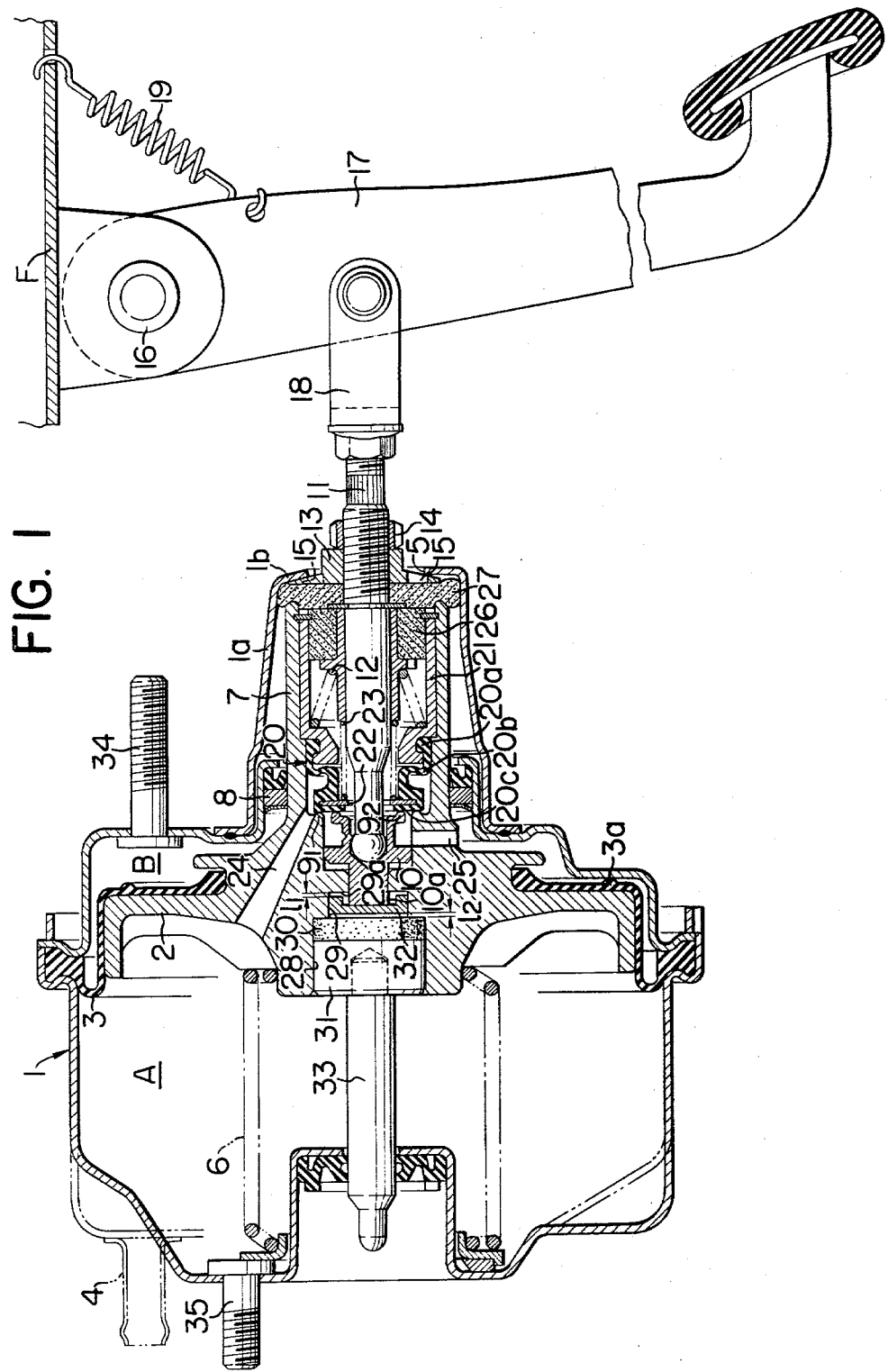
FIG. 1 is a longitudinal sectional side view of the device in an inoperative state.

Referring now to FIG. 1 which illustrates one embodiment of the present invention, the booster has a booster shell 1, interior of which is divided into a first front operating chamber A and a second rear operating chamber B by a booster piston 2 and a diaphragm 3 joined to the back surface thereof, the first operating chamber A being normally communicated with the interior of an intake manifold (not shown) of an internal combustion engine as a negative pressure source through a negative pressure introducing pipe 4 fixedly mounted on the front surface of the booster shell 1. The booster shell 1 has a rearwardly extending cylinder 1a, to an end wall 1b of which is open an atmosphere inlet 5.

The booster piston 2 is normally spring-biased, by a return spring 6 retained in the first operating chamber A, in a direction of retraction, that is, towards the second operating chamber B, the retracting limit thereof being regulated as an annular rib 3a protruded from the back surface of the diaphragm 3 bears on the rear wall of the booster shell 1.

The booster piston 2 is integrally formed with a valve cylinder 7 protruded axially from the rear surface in the center thereof, which is supported slidably on a flat bearing 8 disposed in the extending cylinder 1a and which rear end is open towards the atmosphere inlet 5. The valve cylinder 7 is formed with an annular valve seat $9_1$ on the front inner wall thereof.

In the front portion of the valve cylinder 7 is slidably received a valve piston 10 connected to the front end of an input rod 11, and the piston 10 has a rear end formed with an annular valve seat $9_2$ encircled by the first valve seat $9_1$.

The input rod 11 is normally spring-biased by a return spring 12 in a direction of retraction, the retracting limit thereof being regulated as a movable stopper plate 13 threadably mounted on the input rod 11 bears on the inner side of the end wall 1b. Thus, when the stopper plate 13 is rotated, the meshing position between the stopper plate and the input rod 11 varies so that the retracting limit of the input rod 11 may be laterally adjusted. After such adjustment, the stopper plate 13 may be locked by tightening a locknut 14 similarly threadably engaged with the input rod 11. The movable stopper plate 13 has a vent hole 15 bored therein so as to block the atmosphere inlet 5.

To the rear end of the input rod 11 is connected a brake pedal 17 pivotally supported at 16 on the body F of an automobile through a well known adjustable connecting member 18, the brake pedal 17 having a return spring 19 connected thereto to bias the pedal backwards.

A base end 20a of a cylindrical valve body 20 with opposite ends opened is retained on the inner wall of the valve cylinder 7 through a valve body holding cylinder 21 fitted in the valve cylinder 7. The valve body 20 is formed of a resilient material such as rubber, and a diaphragm 20b of thin wall thickness extends radially and inwardly from the base end 20a and a valve portion 20c of thick wall thickness is provided adjacent the inner peripheral end thereof, the valve portion 20c being opposed to the first and second valve seats $9_1$ and $9_2$. The valve portion 20c may be moved back and forth by deformation of the diaphragm 20b and may also bear on the front end of the valve body holding cylinder 21.

An annular reinforcing plate 22 is embedded in the valve portion 20c, and a valve spring 23 is permitted to act on the reinforcing plate to urge the valve portion 20c against both the valve seats $9_1$ and $9_2$.

The outer portion of the first valve seat $9_1$ is normally communicated with the first operating chamber A through a bore 24 of the booster piston 2, the intermediate portion of the first and second valve seats $9_1$, $9_2$ communicated with the second operating chamber B through a further bore 25, and the inner portion of the second valve seat $9_2$ connected with the atmosphere inlet 5 through the interior of the valve body 20, respectively.

The valve cylinder 7 has an opening at its outer end provided with filters 26 and 27 adapted to purify air introduced through the atmosphere inlet 5 and capable of being deformed so as not to impair the operation of the input rod 11.

The booster piston 2 has a large diameter bore 28 open to the central portion at the front surface thereof and a small diameter bore 29 open to the end in an inner part of said large diameter bore, the large diameter bore 28 slidably receiving successively from its inner part a resilient piston 30 formed of rubber or the like and an output piston 31 of the same diameter as that of the resilient piston, the small diameter bore 29 slidably receiving a reaction piston 32 of a diameter smaller than the resilient piston 30, the small diameter bore 29 further receiving a small shaft 10a, which extends from the front end of the valve piston 10 to face to the rear end of the reaction piston 32. Here, the sliding stroke of the reaction piston 32 is regulated to be smaller than the sliding stroke of the valve piston 10 by the rear end 29a of the small diameter bore 29, that is, the distance from the most advanced position wherein the valve piston 9 bears on the free resilient piston 30 through the reaction piston 32 to the most retracted position wherein the valve portion 20c is fully moved apart from the first valve seat $9_1$. The output piston 31 has an output rod 33 which projects from the front end thereof and which slidably extends through the front wall of the booster shell 1. This output rod 33 is provided to forwardly drive a piston of a well known brake master cylinder not shown.

In the drawings, reference numeral 34 indicates a bolt used to fasten the booster shell 1 to the body F of an automobile, and 35 indicates a bolt used to connect the cylinder body of the brake master cylinder to the front surface of the booster shell 1.

In the following, the operation of the above-mentioned embodiment will be explained. In FIG. 1, the booster is in an inoperative state. The valve piston 10 input rod 11 and brake pedal 17, which are interconnected, are held in retracted limit position at which the movable stopper plate 13 bears on the fixed end wall 1b by the spring force of the return springs 12 and 19. The valve piston 10 causes the second valve seat $9_2$ to be seated on the front surface of the valve portion 20c of the valve body 20 which is seated on the first valve seat $9_1$ by the spring force of the valve spring 23. Accordingly, the first and second operating chambers A and B are cut off in communication with each other and also cut off in communication with the atmosphere 5. This mode of switching neutral state of the valve body 20 may be readily obtained by adjustment of the movable stopper plate 13 as previously described.

In this state, the reaction piston 32 is slightly moved forward from the retracting limit position by the small shaft 10a of the valve piston 10 to form a gap $l_1$ between it and the rear end 29a of the small diameter bore 29 and to also maintain a gap $l_2$ between it and the resilient piston 30.

When the brake pedal 17 is worked to brake the vehicle to move the input rod 11 and valve piston 10 frontwardly while causing a compressive deformation of the filter 26, the second valve seat $9_2$ is moved apart from the valve portion 20c impaired in its forward movement by the first valve seat $9_1$ to permit the second operating chamber B to communicate with the interior of the valve body 20 through the bore 25, that is, with the atmosphere inlet 5. Accordingly, the atmosphere is rapidly introduced into the second operating chamber B and as a consequence, the second operating chamber B becomes higher pressure than the first operating chamber A and the booster piston 2 moves forward against the return spring 6 due to a pressure difference formed between both the chambers A and B to advance the output rod 33 through the resilient piston 30 and the output piston 31, whereby the brake master cylinder not shown is actuated to brake the vehicle.

Since the reaction piston 32 is initially distanced by a gap $l_2$ from the resilient piston 30, the operative reaction of the output rod 33 does not act on the input rod 11 until the reaction piston 32 bears on the resilient piston 30 by forward movement of the valve piston 10, and as a result, the rising characteristic of the output of the output rod 33 becomes acute to provide a good responsiveness of the master cylinder.

When the valve piston 10 bears on the resilient piston 30 through the reaction piston 32 and the resilient piston 30 is compressed by the operative reaction of the output piston 31 to permit a part thereof to be inflated in the small diameter bore 29, a part of said reaction is fed back towards the brake pedal 17 through the valve piston 10, whereby the operator may sense the output or the braking force of the output rod 31. Thus, the boost ratio or the ratio of the output from the output rod 33 to the input into the input rod 11 may be determined by the ratio of pressure receiving area between the output piston 31 in contact with the resilient piston 30 and the reaction piston 32.

Figure 2:
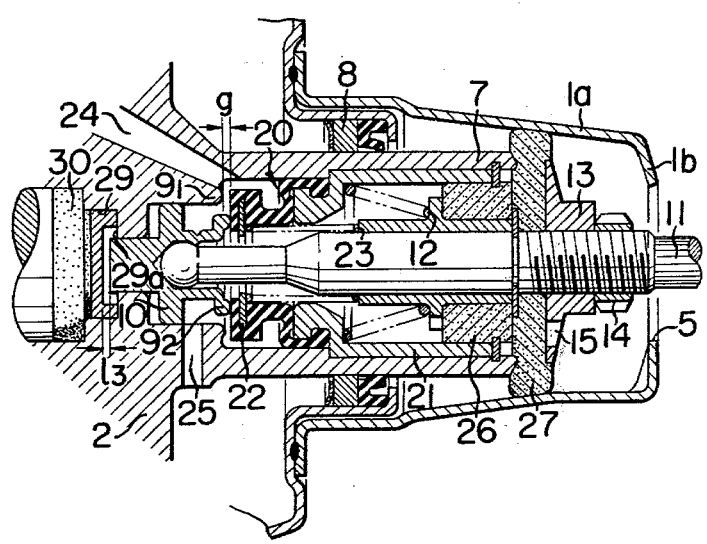
FIG. 2 is a fragmentary view showing the retracting mode.

Next, when the brake pedal 17 is released, the brake pedal 17, input rod 11 and valve piston 10 are retracted by the force of the return springs 19 and 12 to first cause the valve portion 20c to seat on the second valve seat $9_2$ as shown in FIG. 2 and at the same time cause the same to disengage from the first valve seat $9_1$, as a consequence of which pressures of both operating chambers A and B are balanced through the gap g formed between the first valve seal $9_1$ and the valve portion 20c so that the booster piston 2 is retracted by the force of the return spring 6 to release the braking.

In this case, the aforesaid gap g increases as the retracting force of the valve piston 10 increases. That is, when the valve piston 10 vigorously retracts, the valve portion 20c is not only brought to bear on the front end of the valve body holding cylinder 21 but the portion 20c is subject to axial compression and deformation. Thereby, the resistance of flow passage between the first valve seat $9_1$ and the valve portion 20c is decreased and pressures of both operating chambers A and B are rapidly balanced to reduce the time delay of commencement for retraction of the booster piston 2.

It will be noted that the retracting impact force of the valve piston 10 is absorbed into the compression and deformation of the valve portion 20c.

In this manner, when the input rod 11 is retracted, the valve piston 10 is largely retracted because of the wide gap g. However, before the valve piston 10 reaches its retraction limit, the reaction piston 32 is received by the rear end 29a of the small diameter bore 29 and disengaged by a gap l₃ from the valve piston 10 so that the amount of inflation of the resilient piston 30 into the small diameter bore 20 due to the returning force of the output piston 31 decreases by said gap l₃ portion than the case of prior arts.

Then when the booster piston 2, valve piston 10, input rod 11 and brake pedal 17 are returned to the predetermined retraction position shown in FIG. 1, the valve portion 20c is released from compression by the valve piston 10 to reduce the aforesaid gap g and is again seated on the first valve seat 9₁ to wait for next operation.

As described above, in accordance with the present invention, the sliding stroke of the reaction piston is regulated to be smaller than the sliding stroke of the valve piston, and consequently, even if the valve piston is largely retracted to effect quick retraction of the booster piston when the input rod is retracted, it is possible to minimize the amount of inflation and deformation of the resilient piston due to the retraction force of the output piston, thus materially relieving the fatigue and damage of the resilient piston to increase the durability thereof.

What is claimed is:

1. A vacuum-operated booster comprising: a booster shell, a booster piston dividing the interior of said booster shell into a first operating chamber in communication with a vacuum source and a second operating chamber; a valve cylinder, said valve cylinder extending from a rear end of said booster piston and having a first annular valve seat formed at the front end thereof; a valve piston, said valve piston having a second annular valve seat encircled by said first valve seat, said valve piston operatively connected to an input rod; a cylindrical resilient valve body biased to seat on said first and second valve seats and having a hollow interior in communication with the atmosphere; said booster piston having a large diameter bore open to a forward end surface thereof and a small diameter bore open to a rear end wall of said large diameter bore; an output piston, said output piston being slidably received in said large diameter bore and operatively connected to an output rod; a resilient piston, said resilient piston being slidably received in said large diameter bore between said output piston and the rear end wall of said large diameter bore, so as to be compressively deformed by said output piston, said valve piston having its forward end present in said small diameter bore; a reaction piston, said reaction piston being slidably disposed in said small diameter bore between said valve piston and said resilient piston for transmitting the compressive force of said resilient piston to said valve piston, whereby said second chamber and the hollow interior of said resilient valve body being brought into communication with each other through a clearance formed between said second valve seat and said resilient valve body when said valve piston is moved forward; a clearance formed between said first valve seat and said resilient valve body to bring said first and second chambers into communication with each other when said valve piston is moved rearward, and said resilient valve body being compressively deformed in an axial direction by the rearward movement of said valve piston, after abutment of said reaction piston against the end wall of said small diameter bore whereby, the sliding stroke of said reaction piston being made smaller than that of said valve piston.

2. A vacuum-operated booster according to claim 1, wherein: said resilient valve body being held at a switching neutral position and having said valve body in seating engagement with both of said first and second seats during the rearward limit position of said input rod and simultaneously said valve piston is further moved rearward due the resilient deformation of said valve body to a certain extent from its rearward limit position, whereby said reaction piston is in abutting engagement with the end wall of said small bore.

* * * * *